No. 702,929. Patented June 24, 1902.
G. M. DEPEW.
BALE TIE.
(Application filed Oct. 8, 1901.)
(No Model.)
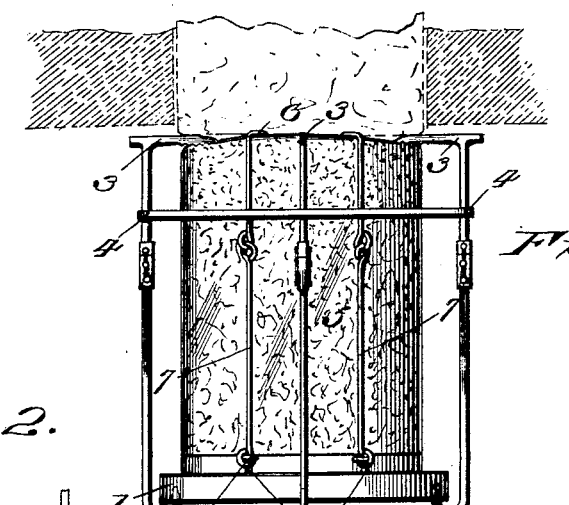
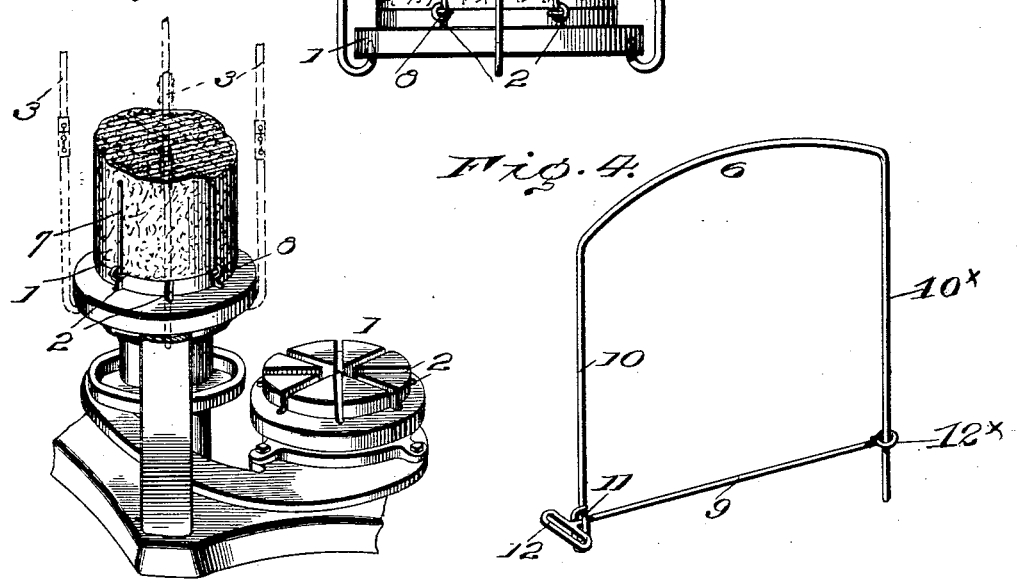
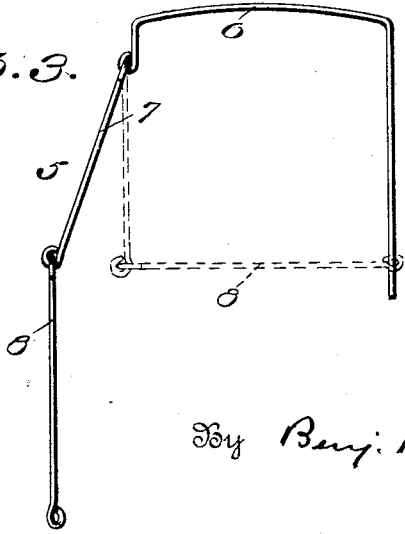
Witnesses
A. H. Mater
A. H. Balloch
Inventor
G. M. Depew.
By Benj. R. Catlin,
Attorney
THE NORRIS PETERS CO., PHOTO-LITHO., WASHINGTON, D. C.

UNITED STATES PATENT OFFICE.

GEORGE M. DEPEW, OF CANANDAIGUA, NEW YORK.

BALE-TIE.

SPECIFICATION forming part of Letters Patent No. 702,929, dated June 24, 1902.

Application filed October 8, 1901. Serial No. 78,017. (No model.)

*To all whom it may concern:*

Be it known that I, GEORGE M. DEPEW, a resident of Canandaigua, in the county of Ontario and State of New York, have invented certain new and useful Improvements in Bale-Ties; and I do hereby declare the following to be a full, clear, and exact description of the invention, such as will enable others skilled in the art to which it pertains to make and use the same.

The invention relates to bale-ties, and has for its object to provide a simple, economical, and efficient tie that can be readily and securely applied to a bale seated on a supporting-base in a press.

The invention consists in the construction herein described and pointed out.

In the accompanying drawings, Figure 1 is an elevation showing a bale situated on a base, also bale cut-offs, cut-off band, and ties. Fig. 2 is a perspective of a base. Fig. 3 is an elevation of a bale-tie, its closed or operative situation being indicated by broken lines. Fig. 4 is a similar view of a modified tie.

Numeral 1 denotes a bale-supporting base pertaining to a press and movable into a position above a steam, hydraulic, or other pressing device and between it and the bale to be compressed thereby. In practice at least two bases are preferably used alternately, each being suitably moved into and out of the pressing position in a well-known manner.

2 denotes a series of diametric grooves in the upper face of the base, each being about an inch wide and an inch and a half deep, the exact dimensions being immaterial.

3 denotes cut-offs to separate the pressed lower part of a body of pressed material from that above in usual manner to form a bale.
4 denotes a band holding the cut-offs in position.

Ties are applied to the bale after its supporting-base has been moved away from over the compressing device, such as a plunger or piston, and portions of said ties are inserted in the grooves 2 immediately under the bale in the tying operation. As heretofore practiced entire pieces of straight wire have been entered in the base and subsequently bent over the bale, with the effect to produce a loose fit and a waste of wire, it being impracticable to ascertain in each case the length of wire required.

I am aware that jointed ties are not new and that a tie comprising bars connected at their adjacent ends by a wire and their opposite ends also connected by a wire provided with a key adapted to engage one of the bars is old. Such devices could not be applied to a bale in the manner herein described, since the fastener is applied to the side of the bale and the key is loosely jointed to the fastening-wire, precluding entering it in a base at the bottom of a bale, as herein contemplated, the size of the key also preventing the desired operation.

The body or main part of the improved ties are approximately U-shaped and in practice are pushed down over or placed about the bale and the limbs or side members of the ties secured by fastening-wires pushed endwise into grooves 2 of the base, a connection being subsequently made between a side member of the U-shaped part of the tie and the fastening-wire.

Referring to Fig. 3, 5 denotes a tie having an integral side and top 6 and a side 7, jointed to the top, as indicated, the parts being in use of an approximate U form.

8 denotes a fastener jointed to the side 7.
After the main part of the tie has been pushed down over the bale and within the band 4 (see Fig. 1) the joints between the side 5 and the parts 6 and 8 permit the fastener to be moved laterally and lengthwise, as indicated, and so that the end of the fastener can be entered in a groove 2 and pushed therethrough and subsequently tied to the tie member opposite the jointed member or side.

As shown in Fig. 4, the joint between the side member and top is dispensed with and a separable fastener 9 employed. A side 10 of the tie is provided with a loop or ring 11 and the fastener with a loop or ring 12.

The body of the approximately U-shaped tie, comprising the top 6 and side members 10 and $10^\times$, is first placed on the bale. The small end of the fastener is then entered and passed through the loop 11 and a groove 2 in the base until stopped by its handle 12 at loop 11, whereupon the free or small end of the fastener and the side member $10^\times$ are connected by entering the free end of side member 10× in the loop or ring 12×, as illustrated. The connection of the fastener 9 and member 10 is a loose or pivotal joint until said fastener is fixed to the opposite member, which is effected by suitably bending the end of member 10× about the fastener.

Having thus described my invention, what I claim as new, and desire to secure by Letters Patent, is—

1. A bale-tie having a body of approximate U form comprising a top and side members, and a fastener loosely connected to one side member and movable lengthwise under a bale when the said body is on said bale, and means for securing the ends of the other side member and the fastener together on the bale.

2. A bale-tie having a body of approximate U form comprising a top and side members, and a fastener loosely connected to one side member and movable lengthwise under a bale when the said body is on said bale, and means for securing the ends of the other side member and the fastener together on the bale, said fastener having a loop at each end and the first-named side member having a loop at its end.

3. A bale-tie having a body of approximate U form comprising a top and side members, and a fastener loosely connected to one side member and movable lengthwise under a bale when the said body is on said bale, and means for securing the ends of the other side member and the fastener together on the bale, said means comprising a loop.

In testimony whereof I have signed this specification in the presence of two subscribing witnesses.

GEORGE M. DEPEW.

Witnesses:
ROBERT F. THOMPSON,
FRANK A. CHRISTIAN.